No. 619,779.  Patented Feb. 21, 1899.
C. A. NASH.
PERMUTATION LOCK.
(Application filed Mar. 8, 1898.)
(No Model.)
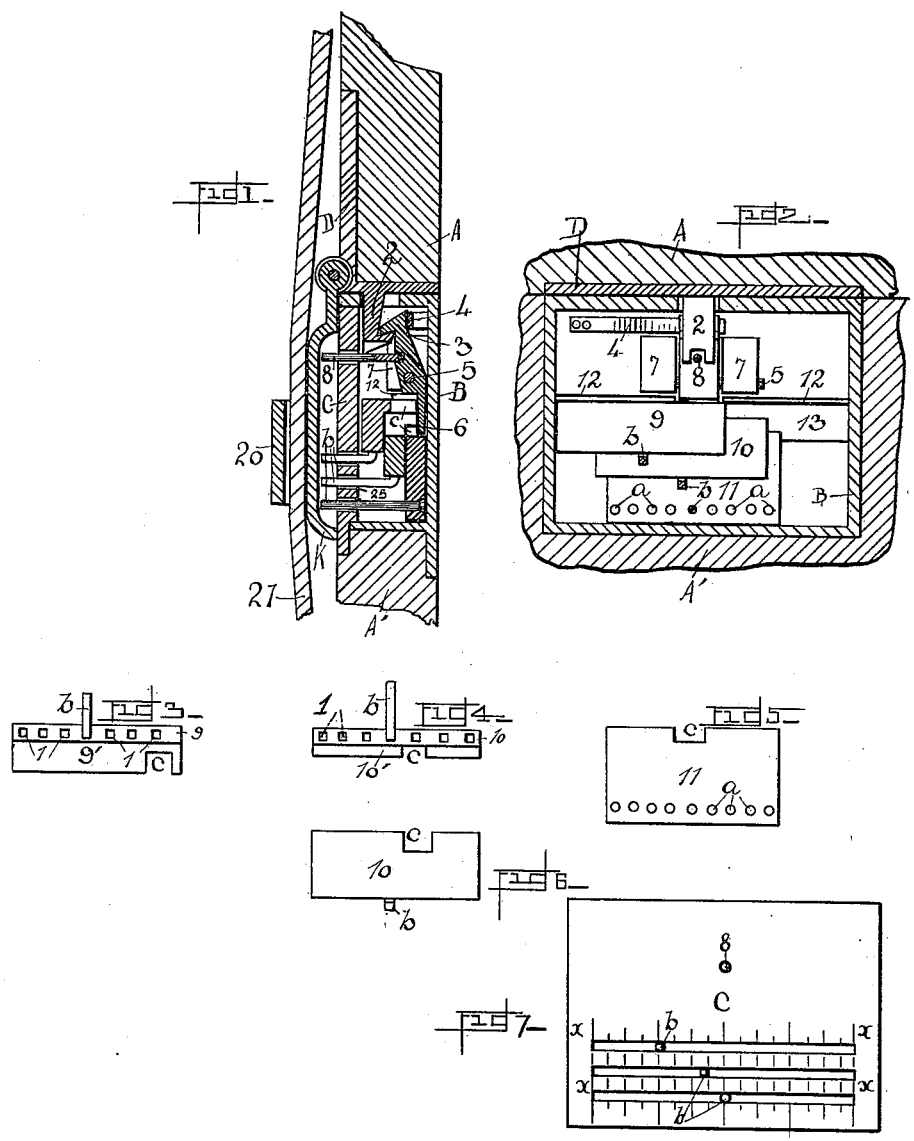
WITNESSES:
D. O. Barnell.
A. M. Elkjer.
INVENTOR
Charles A. Nash
BY
ATTORNEY.

UNITED STATES PATENT OFFICE.

CHARLES A. NASH, OF CRESTON, NEBRASKA.

PERMUTATION-LOCK.

SPECIFICATION forming part of Letters Patent No. 619,779, dated February 21, 1899.

Application filed March 8, 1898. Serial No. 673,047. (No model.)

*To all whom it may concern:*

Be it known that I, CHARLES A. NASH, residing at Creston, in the county of Platte and State of Nebraska, have invented certain useful Improvements in Permutation-Locks; and I do hereby declare that the following is a full, clear, and exact description of the invention, such as will enable others skilled in the art to which it appertains to make and use the same, reference being had to the accompanying drawings, which form a part of this specification.

This invention has relation to a novel improvement in permutation-locks.

In the accompanying drawings I have shown, in Figure 1, a broken sectional view of a trunk or box provided with my improved combination-lock. Fig. 2 shows a front view in section and with portions broken away, while Figs. 3, 4, 5, and 6 show, respectively, edge and top views of the various shifting tumblers as used in my invention.

My invention comprises, essentially, a pivoted hasp, which is locked in a certain position by means of a plurality of shifting tumblers, which tumblers are provided with registering seatings and into which seatings the stem of the hasp or dog is forced when said seatings are made to register.

In the accompanying drawings, A' represents a portion of a trunk, box, or casing to which my lock is to be attached, my lock proper comprising a housing B, preferably rectangular, provided with the face-plate C, which can be secured by any suitable means. Positioned within this housing and transversely extending across the same is a guiding-rail 13, provided with an upwardly-extending flange 12 and the hasp or dog retaining ears 7 7, through which a bar 5 passes, which bar pivotally supports the dog 3, provided with the rearwardly-extending stem 6, as is clearly shown in Fig. 1. Normally working against the head 3 of this dog is a spring 4 to continually force that dog into a forward direction. Working upon the railing 13 and partly overlapping the same is the tumbler 11, as is clearly shown in Fig. 2, which tumbler 11 slides between the railing 13 and the lower edge of the housing B, as is shown in Fig. 2. This tumbler is provided with a plurality of openings A, into one of which is removably inserted a guiding or operating stem $b$. Working upon this tumbler 11 and overlapping the forward edge of the same is a second tumbler 10. The lip 10' overlaps the tumbler 11, so that this tumbler 10 nicely rides upon the sliding tumbler 11. This tumbler 10 is provided with a plurality of openings 1 1, into one of which openings is removably placed an operating-stem $b$. Working upon this intermediate sliding tumbler 11 is a top tumbler 9, which tumbler has a downwardly-extending lip 9' a little longer than the lip 10' of the sliding tumbler 10, so that this lip 9' rides upon the railing 13, as does the lip 10'. The thickness of these three shifting tumblers 9, 10, and 11 is so gaged that when the shield C is placed in proper position they are held one upon the other, the transverse width of the three shifting tumblers being so gaged that the first (marked 11) works against the lower end of the lock-housing B, while the lip 9' of the upper shifting tumbler 9 works against the upwardly-extending flange 12, so that these shifting tumblers after once being placed in proper position are tightly but movably and adjustably held within the housing.

In referring to Figs. 3, 4, 5, and 6 it will be noticed that each of the shifting tumblers is provided with a seating $c$, the tumblers 10 and 11 with the seating $c$ extending transversely through the same, while the remaining shifting tumbler 9 simply has its lip incised. Now in order to lock a trunk provided with my improved permutation-lock it would be necessary to so position the tumblers that their incisions or seatings C register, so that as the hasp 2 descended to engage the dog 3 the stem 6 of the dog would be thrown upward, and unless the seatings registered this dog would be immovably held and would prevent the insertion of the hasp 2. As soon, however, as the trunk is locked the tumblers are shifted so that the seatings are brought out of alinement, and before the lock can then be opened the tumblers will have to be brought into proper alinement. This is accomplished in bringing the guiding-stems or operating-stems $b$ into proper position, and to aid the operator in doing this slots 25 within the face-plate C of the lock are provided with graduations or scales x, which can be either lettered or numbered.

In order to change the combination at any time, it is simply necessary to reposition the operating-stems b, when they will form a new combination in conjunction with the scale upon the face-plate. To further protect these stems b, I provide the pivoted shield K, and this shield K is preferably provided with an ordinary loop 20, through which an ordinary trunk-strap 21 is made to pass, so that when this lock is used in conjunction with a trunk the lock is nicely protected.

Now, having thus described my said invention, what I claim as new, and desire to secure by United States Letters Patent, is—

1. The combination with a pivoted spring-actuated dog, of a plurality of sliding tumblers, each tumbler being provided with a seating adapted to receive one end of said pivoted dog, a series of openings within said tumblers and a plurality of pins adapted to be movably held within said tumblers.

2. The combination with a pivoted spring-actuated dog, of a plurality of sliding tumblers, each tumbler being provided with a seating adapted to receive one end of said pivoted dog, a series of openings within said tumblers, a plurality of pins adapted to be movably held within said tumblers, and an operating-stem extending from said pivoted dog.

3. The combination with a suitable lock-housing, of a flange extending upward within said housing, an incised tumbler riding against the lower edge of said housing, a plurality of additional tumblers riding upon said first tumbler, each additional tumbler being provided with a downwardly-extending lip, said lip working between said first tumbler and said flange, a dog pivotally positioned within said lock, a seating within said flange and said tumblers, a spring to normally force said dog in one direction, and operating-stems to actuate said dog and said sliding tumblers, as and for the purpose set forth.

4. The combination with a lock-housing, of a flange superposed within said housing, a plurality of shifting tumblers working between said flange near one edge of said lock-housing, a plurality of openings within the edges of said shifting tumblers, a plurality of L-shaped operating-bars within said tumblers, a dog pivotally positioned within said housing, a seating within said flange and said tumblers so arranged that at one point all of said seatings will register, a spring to normally force said dog in one direction, an operating-stem extending from said dog, and a graduated shield forming part of said lock, said operating-stems extending through the slots of said shield, as and for the purpose set forth.

In testimony whereof I affix my signature in presence of two witnesses.

CHARLES A. NASH.

Witnesses:
GEO. A. ROHRBOUGH,
ABRAMS PALMATER.